United States Patent Office 2,771,401
Patented Nov. 20, 1956

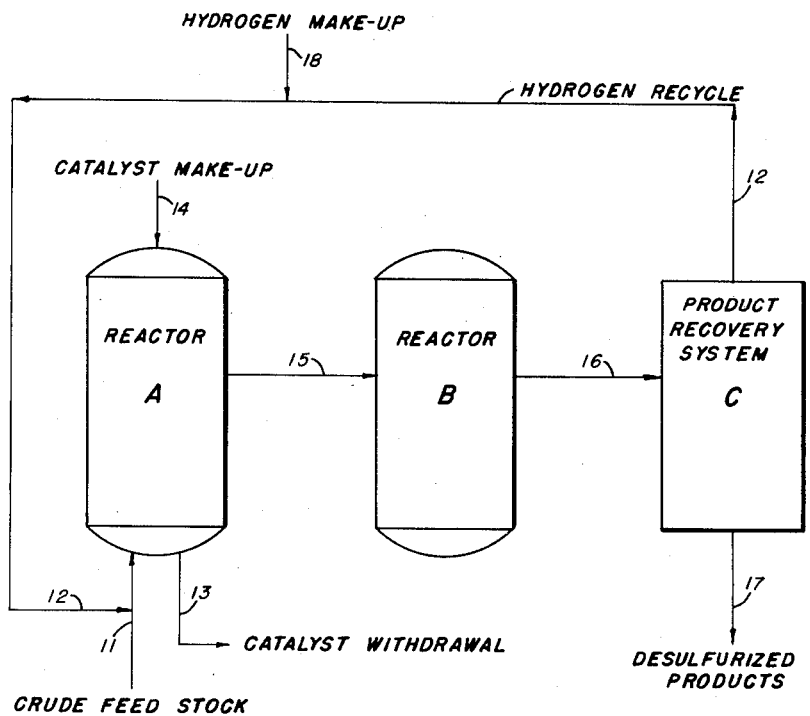

2,771,401

DESULFURIZATION OF CRUDE OIL AND CRUDE OIL FRACTIONS

George R. L. Shepherd, Baytown, Tex., assignor, by mesne assignments, to Esso Research and Engineering Company, Elizabeth, N. J., a corporation of Delaware Application August 5, 1954, Serial No. 447,993

2 Claims. (Cl. 196—28)

This invention is directed to a method for removing sulfur from crude oil and crude oil fractions having a high ash content.

The present invention is particularly adapted for the treatment of a crude oil containing materials which deposit as solids upon catalytic surfaces when the hot feed stock is brought into contact with said catalytic surfaces. The nature of these materials in the crude petroleum and in the crude petroleum fractions is not completely understood. These materials may be porphyrins, porphyrin-metal complexes including nickel, iron, copper, vanadium porphyrins as well as other organo-metallic compounds. The crude petroleum may also contain sediment, including iron such as scale from lines and storage tanks. These also may in part consist of high boiling hydrocarbon residues. Hereafter for convenience in the specification these materials will be referred to as solids or residues although it is to be understood that actually in the feed stocks some of these materials may not be solids but may be in the liquefied form and may form the solids only when the feed stock is vaporized at a high temperature and brought into contact with a catalytic surface.

Specific examples of crude petroleum oils and fractions of crude petroleum oil are West Texas crudes, Mississippi crudes, Middle East crudes, Central American crudes, Western Canada crudes, reduced crudes from these same sources, gas oils, and particularly the deasphalted oils from crude residuum.

The present invention is directed to a method for hydrodesulfurizing petroleum feed stocks which are selected from the class of high ash content, high sulfur content, petroleum crude oils and petroleum crude oil fractions.

In accordance with the present invention the feed stock to be desulfurized is passed into a first catalytic zone at a temperature within the range of 700° to 850° F. and containing a highly adsorptive material possessing some catalytic properties for hydrodesulfurization for petroleum hydrocarbons. The effluent from the first catalytic zone is then passed to a second catalytic zone where it is contacted with sulf-active catalyst to reduce its sulfur content by at least 50% and usually to an amount less than about .1%. A desulfurized petroleum fraction is recovered as product from the second catalytic zone.

The class of high adsorptive materials possessing in addition some catalytic properties for hydrodesulfurization for petroleum hydrocarbons are known to the art. Specific materials suitable for this purpose are: bauxite, activated carbon such as activated bituminous carbon, activated coconut charcoal and petroleum coke, artificial and synthetic clays and silica-alumina materials. These materials may be fresh or may have become spent in other uses before being used in the present process, for example, a spent silica alumina cracking catalyst which has been discarded from a cracking process is suitable for use in the first contacting step of the present process.

Sulf-active hydrogenation catalysts suitable for use in the second catalytic zone of the present process are known to the art. Examples of suitable catalysts selected from this class are the oxides and sulfides of V, Cr, Mn, Fe, Co, Ni, Mo, W. These may be used either alone or in admixture or may, if desired, be used with other materials such as alumina, magnesia, silica, zinc oxide. Specific examples of suitable sulf-active catalysts are cobalt molybdate on alumina, nickel tungsten sulfide, cobalt sulfide on alumina, molybdenum oxide on alumina, nickel sulfide on alumina and tin sulfide on alumina.

The method for practicing the present invention will now be described in greater detail in conjunction with the drawing in which the sole figure is in the form of a diagrammatic flow sheet.

Turning now specifically to the drawing, a feed stock which is either a crude or a crude oil fraction containing at least 30 parts per million of solids is introduced through inlet line 11 and has admixed therewith hydrogen through line 12. The feed oil with hydrogen admixed therewith is passed into first catalytic zone A. Sufficient hydrogen is admixed with the feed stock to maintain a ratio of hydrogen to oil within the range of 2 to 40 moles of hydrogen per mol of feed stock. The conditions within reactor A are a temperature within the range of 700° to 850° F., a pressure in the range of 0 to 500 pounds per square inch gauge and a feed rate within the range of 0.5 to 20.0 volume of liquid feed per volume of catalyst per hour. Within reactor A harmful contaminants in the feed stock are deposited on the catalyst and in addition a considerable amount of desulfurization occurs. Because of the large amounts of materials deposited on the catalyst it is necessary to remove the catalyst with said deposited materials either continuously or periodically and replace with fresh catalyst. This is indicated by line 13 for catalyst withdrawal and line 14 for introducing make-up catalyst.

The effluent mixture from the first reactor A is withdrawn through line 15 and passed to reactor B. In reactor B a sulf-active hydrogenation catalyst is maintained at a temperature within the range of 700 to 850° F. and a pressure within the range of 0 to 500 pounds per square inch gauge. The feed rate in reactor B usually will be maintained within the range of 0.2 to 10.0 volumes of liquid feed per volume of catalyst per hour but this rate may be varied in order to obtain 50% or more desulfurization giving a product having a sulfur content usually no greater than about .1%. Product from reactor B is withdrawn through line 16 and passed to a system for recovering product. In the drawing the product recovery system is indicated by a rectangle designated as C from which desulfurized products are removed through outlet line 17 and from which hydrogen is removed through line 12 and recycled to the feed inlet line 11. Make-up hydrogen for continuously carrying out the process is introduced through inlet line 18 to line 12.

It is preferred to operate the catalytic zone A at a temperature within the range of 30 to 60° above the temperature of reactor B in order to provide some dehydrogenation of naphthenes with maximum hydrodesulfurization and minimum hydrocracking in the process.

The feed may enter reaction zones A and B in vapor phase or in mixed vapor and liquid phase. The lower boiling feed stocks will be in vapor phase and the higher boiling ones, such as residua, in mixed phase.

It is to be understood that the catalyst in reactor A may be arranged in the form of a fixed bed or as a fluidized bed. If the catalyst is arranged in the form of a fixed bed, it will be desirable to have a pair of reactors connected in parallel so that one of the reactors may be taken out of service for the purpose of replacing the catalyst while the other reactor is in use. Alternatively, the catalyst in reactor A may be maintained as a fluidized catalyst bed in which the catalyst may be continuously or periodically withdrawn for regeneration or replacement. Similarly, the catalyst in reactor B may be in the form of a fixed bed or a fluidized bed. If the catalyst in reactor B is a fixed bed, it will be desirable to maintain at least a pair of reactors so that one of the reactors will be available for use while the catalyst in the other is being replaced or regenerated by oxidation of the carbonaceous deposits that may form on the catalyst after extended use. If the catalyst is in the form of a fluidized bed in reactor B, spent catalyst may be continuously or periodically withdrawn for regeneration or replacement; when the feed is such that it is substantially completely vaporized under the conditions prevailing in reactions A and B, it is preferred to have the catalyst in reactors A and B in the form of fluidized beds and to replace continuously the spent catalyst in reactor A so that the solids deposited thereon by the feed stock are kept from building up to such an extent as to hinder the desulfurization carried out therein.

I claim:

1. A method for desulfurizing a naphthenes-containing petroleum feed stock selected from the group of crude oils and crude oil fractions containing at least 30 parts per million of solids including the steps of heating said selected feed stock to a temperature within the range of 700 to 850° F. whereby at least a substantial portion of said feed stock is vaporized, contacting said heated feed stock at a temperature within said range in a first catalytic zone with a spent silica-alumina cracking catalyst possessing catalytic properties for hydro-desulfurization of petroleum hydrocarbons in the presence of hydrogen in an amount of 2 to 40 moles per mol of oil, a pressure in the range of 0 to 500 pounds per square inch gauge and a feed rate within the range of 0.5 to 20 volumes of liquid feed per volume of spent catalyst per hour, removing the effluent from said catalytic zone and contacting it in a second catalytic zone with an alumina supported cobalt molybdate catalyst at a temperature within the range of 700 to 850° F., a hydrogen ratio of 2 to 20 moles per mol of oil, a pressure within the range of 0 to 500 pounds per square inch gauge and a feed rate in the range of 0.2 to 10.0 volumes of liquid feed per volume of cobalt molybdate catalyst per hour, removing effluent from said second catalytic zone and recovering a desulfurized oil product, said first catalytic zone being maintained at a temperature within the range of 30 to 60° greater than the temperature of the second catalytic zone whereby at least a portion of said naphthenes are dehydrogenated, whereby hydrodesulfurization is maximized and whereby hydrocracking is minimized.

2. A method for desulfurizing a naphthenes-containing petroleum feed stock selected from the group of crude oils and crude oil fractions containing an appreciable amount of ash-forming constituents including the steps of heating said selected feed stock to a temperature within the range of 700° to 850° F. whereby at least a substantial portion of said feed stock is vaporized, contacting said heated feed stock at a temperature within said range in a first catalytic zone with a spent silica-alumina cracking catalyst in the presence of hydrogen in an amount of 2 to 40 moles per mol of oil, a pressure in the range of 0 to 500 pounds per square inch gauge and a feed rate within the range of 0.5 to 20 volumes of liquid feed per volume of said spent catalyst per hour, removing the effluent from said first catalytic zone and contacting it in a second catalytic zone with a gamma alumina-supported sulf-active hydrogenation catalyst at a temperature within the range of 700 to 850° F., a hydrogen ratio of 2 to 20 moles per mol of oil, a pressure within the range of 0 to 500 pounds per square inch gauge and a feed rate in the range of 0.2 to 10.0 volumes of liquid feed per volume of catalyst per hour, removing effluent from said second catalytic zone and recovering a desulfurized oil product, said sulf-active hydrogenation catalyst being selected from the class consisting of oxides and sulfides of V, Cr, Mn, Fe, Co, Ni, Mo and W, said first catalytic zone being maintained at a temperature within the range of 30° to 60° greater than the temperature of the second catalytic zone whereby at least a portion of said naphthenes are dehydrogenated, whereby hydrodesulfurization is maximized and whereby hydrocracking is minimized.

References Cited in the file of this patent

UNITED STATES PATENTS

| | | |
|---|---|---|
| 2,687,985 | Porter et al. | Aug. 31, 1954 |

FOREIGN PATENTS

| | | |
|---|---|---|
| 1,056,387 | France | Oct. 21, 1953 |
| 1,064,703 | France | Dec. 30, 1953 |